United States Patent Office 3,030,255
Patented Apr. 17, 1962

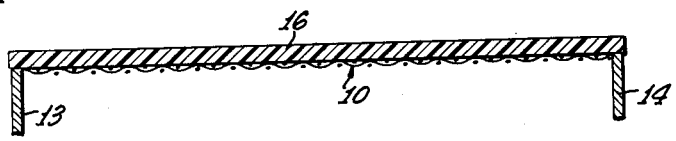
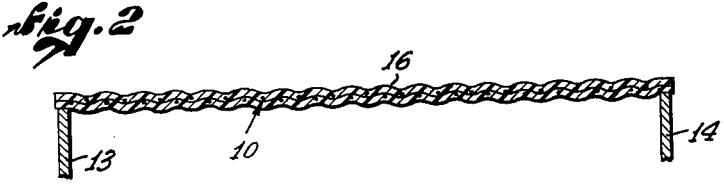
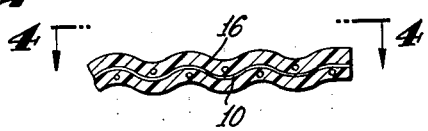
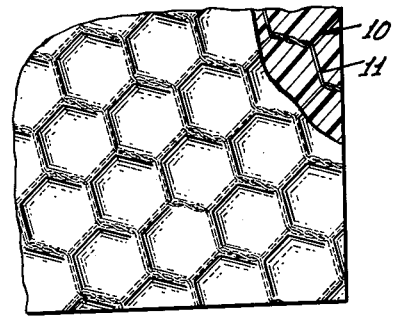
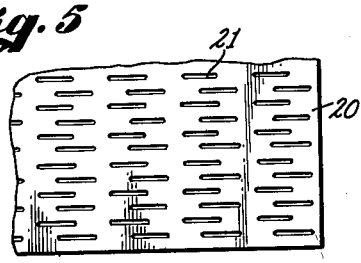
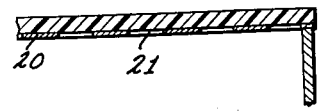
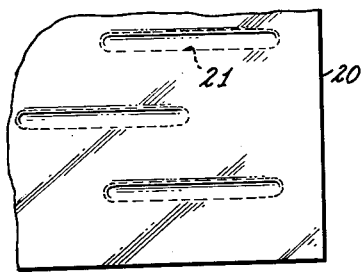

3,030,255
ORNAMENTAL REINFORCED PLASTIC SHEET MATERIAL AND METHOD OF MAKING SAME
Jack W. Winston, Las Vegas, Nev., assignor to Sheppard Enterprises, Las Vegas, Nev., a corporation of Nevada
Filed Nov. 24, 1958, Ser. No. 775,946
10 Claims. (Cl. 154—47)

This invention relates to a method of making ornamental reinforced plastic sheet material and the product resulting from application of the method.

Plastic materials in sheet form and otherwise are now used widely in industry for many different purposes, these materials having characteristics making them useful for many different purposes. The method described herein is intended to enlarge and enhance the characteristics and capabilities for use of plastic materials particularly in sheet form. The method is one which provides a reinforced plastic sheet adapted for use in many different applications in industry while at the same time providing the sheet with a very pleasing ornamental surface or surface appearance which may be varied widely in accordance with particular applications and adaptations of the method. The product resulting from the method is a strong and highly useful sheet of reinforced plastic material having a desired, pleasing and ornamental appearance.

A primary characteristic of the method lies in its simplicity. In carrying out the method in a preferred form, a layer or sheet of thermoplastic material is placed on a piece or layer of foraminous material, for example, a metal wire mesh material which is to serve as the reinforcing member or lamination in the final product. The thermoplastic material is then heated sufficiently to allow the plastic material to sag down into the interstices between strands of the wire mesh material. By the process the thermoplastic material may be heated only sufficiently to cause it to adhere to the wire mesh reinforcing material or it may be heated sufficiently so that the reinforcing material becomes fully imbedded in the plastic material, that is the plastic material fully enveloping the strands of the reinforcing material.

The resulting product is one which is reinforced by reason of the reinforcing material adhered to it or imbedded in it and accordingly having improved strength and characteristics appropriate for industrial uses. A very important feature of the invention is however that in the process as so far described, the sheet of plastic material acquires a pleasing and ornamental appearance and this ornamentation or ornamental appearance can be varied widely as desired by slightly varying the method principally by varying the nature of the reinforcing material used. The reinforcing material may be any foraminous material or as mentioned above, in particular, wire mesh material such as chicken wire having wire strands with interstices between the strands. The effect of the method is that when the thermoplastic material is heated, it sags down between the strands, that is into the interstices so that when cooled the surface is uneven, it having a uniform pattern, the points where it has sagged and it has not sagged corresponding to the pattern of strands and interstices of the reinforcing material. As can be readily seen the method makes it possible to very conveniently produce any desired ornamental pattern in the finished sheet of plastic material by using reinforcing material having a pattern corresponding to that which it is desired to produce in the finished product.

The foregoing outlines the general nature of the method and the resulting product.

The principal object of the invention is to produce, that is to provide a method for producing reinforced ornamental plastic material particularly sheets of plastic material.

A further object of the invention is to provide a method for forming ornamental patterns in thermoplastic material by placing a sheet of the material over a member having a pattern which it is desired to reproduce, heating the thermoplastic material and allowing it to sag down and deform in accordance with the pattern or formation or configuration of the said member.

A further object of the invention is to provide a method for making ornamental reinforced plastic sheets comprising placing a sheet of thermoplastic material on a stretched piece of or sheet of reinforcing wire mesh material, heating the thermoplastic material until it is plastic, allowing it to sag down into the interstices in the reinforcing material so that it adheres to the reinforcing material or completely imbeds the reinforcing material and cooling the thermoplastic material to form the finished product having an ornamental surface corresponding to the pattern of the reinforcing material.

Another object of the invention is to provide a method as in the foregoing object wherein the strands of the reinforcing material are roughened in order to assist the thermoplastic material in adhering thereto.

Further objects and many advantages of the invention will become apparent from the following detail description and annexed drawings wherein:

FIG. 1 is a schematic view of a piece of reinforcing material having a sheet or layer of thermoplastic material thereon before heating;

FIG. 2 is a schematic view similar to FIG. 1 showing a sheet of thermoplastic material after heating;

FIG. 3 is an enlarged view of a portion of FIG. 2;

FIG. 4 is a plan view of FIG. 3;

FIG. 5 is a schematic view of a piece of foraminous material which by way of example is a piece of expanded metal;

FIG. 6 is a schematic view of thermoplastic material placed on the material of FIG. 5 after heating and sagging of the thermoplastic material;

FIG. 7 is an enlarged view of the material of FIG. 5.

Referring to the annexed drawings, the figures of the drawings are representative schematically of a preferred method of practicing the invention. The invention is characterized by simplicity and the disclosure herein is intended to sufficiently describe and disclose its principles to enable anyone skilled in the art to practice it by following the disclosure.

Referring to FIG. 1 of the drawings, this figure illustrates schematically a reinforcing member or a layer of reinforcing member 10 which by way of example is conventional chicken wire of netting which is illustrated in plan in FIG. 4. As is of course well known this type of wire is comprised of spaced strands as shown at 11 in FIG. 4 having relatively large interstices or openings between the strands. The reinforcing member 10 as shown in FIG. 1 is preferably stretched between support members as shown at 13 and 14. In the preferred manner of practicing the invention the reinforcing member 10 is stretched between supporting members as described or equivalent members and a layer of thermoplastic material 16 is placed or layed over the reinforcing member. It is possible to practice the method by simply laying the thermoplastic sheet over the reinforcing member without stretching the latter. Stretching of the reinforcing member is however preferred and this might of course be done by more complex means not herein illustrated, and not essential to the principles of the method. The piece of reinforcing material 10 might of course be an extension of a roll of the material and it may be cut off from the roll before or after application of the herein method.

The thermoplastic material 16 may be any of various known types of thermoplastics but the preferred one is high impact styrene. Any thermoplastic material may be used which may be placed in sheet form over the reinforcing material, heated to plasticity and allowed to sag down onto or into the reinforcing member as will be described hereinafter.

The reinforcing member may be any of various types of foraminous sheet materials in addition to the chicken wire disclosed above. The reinforcing member may be any of various wire mesh materials having interstices between the wire strands thereof.

In practicing the method, heat is next applied to the sheet of thermoplastic material 16 to cause it to soften and become plastic sufficiently so that the softened material will sag down into the interstices in the reinforcing material 10 and around the strands thereof. The actual manner of applying the heat is not critical. The heat may be applied in any of various ways. A preferred way is to simply place the stretched reinforcing member 10 and overlying sheet of thermoplastic material in a heating chamber capable of being heated to the appropriate temperature to soften and plasticize the thermoplastic material. As the thermoplastic material softens and sags down it forms a surface pattern corresponding to the pattern of strands and interstices in the reinforcing member. In this manner any desired, pleasing ornamental surface appearance can be achieved on or in the thermoplastic material by selecting a reinforcing member or reinforcing material having a pattern which it is desired to reproduce. The thermoplastic material may be heated only sufficiently so that there is enough sagging to securely adhere the reinforcing member to its surface. On the other hand the thermoplastic material may be heated sufficiently so that it sags fully through the interstices and so that it fully envelopes the strands between interstices so that in the ultimate product the reinforcing member is embedded in the thermoplastic material.

After the desired degree of deformation of the plastic material, that is sagging into or onto the reinforcing member has taken place the assembly is allowed to cool and the product consisting of the plastic material 16 and the reinforcing member 10 can be removed and utilized for industrial purposes as desired. The plastic material 16 now having a uniform surface pattern of depressions and rises corresponding to the pattern of the reinforcing member.

The foregoing describes a specific embodiment of the process, it being fully capable of being practiced using the information given without experimentation. The choice of types of reinforcing material may be made by one skilled in the art or anyone practicing the invention and the method is equally applicable with different types of thermoplastic materials, the choice of materials, the thickness of sheets, etc. being dependent upon the precise results one desires to achieve and being well within the abilities of one skilled in the art.

As a specific example of the application of the method in a precise set of circumstances a sheet of high impact styrene of a thickness of eight to twenty thousandths of an inch is used as the thermoplastic material. The reinforcing member is any commercially available wire mesh material which the plastic material can adhere to. With this particular material a temperature in the range of 300° Fahrenheit to 325° Fahrenheit produces sufficient plasticity that is flow of plastic material to produce the effect or effects described above and the method will be carried out with this range of heating in a range of from 30 to 45 seconds.

Another feature of the invention is that the strands of the reinforcing material particularly when this is wire mesh material may be roughened to facilitate the adhering of the plastic material to the reinforcing member. The reinforcing member may be roughened by any means which will interfere with the normal smoothness of the surface of its parts. The reinforcing member may thus be subjected to wear, weathering, usage or artificial means to roughen the surface of its parts. The reinforcing member or material may be roughened by treating it under rollers or comparable members having roughened or uneven surface capable of roughening the surfaces of the parts of the reinforcing member.

FIG. 5 of the drawing shows by way of example another type of reinforcing member or material which is of the expanded metal type as shown at 20. This material is of a type which is formed initially by cutting slits or slots in the material as shown at 21 and by then stretching the material transversely as respects the slits in order to open them out. A foraminous or perforated material is formed in this manner and sometimes the stretching of the material may be sufficient so that the material adjacent the edges of the slits is deformed outwardly from the plane of the metal somewhat in the manner of an eyelid. This material illustrates by way of example types of foraminous, perforated or wire mesh material that may be used as the reinforcing member in the product of the invention.

FIG. 6 illustrates schematically the material of FIG. 5 as the reinforcing member with thermoplastic material laid over it prior to heating allowing it to sag down into the openings in the material 20.

The ultimate product resulting from the method is as described above. The resulting product may have slight variations as described depending upon the type of reinforcing material utilized and the degree to which the thermoplastic material is allowed to sag down onto or into the reinforcing material and the degree to which the reinforcing material may become embedded in the thermoplastic material. The resulting product is in any event a strongly reinforced plastic sheet highly useful and adaptable for industrial uses. It is furhermore a piece of material having a highly ornamental and pleasing appearance having a pattern corresponding to that of the reinforcing material used.

From the foregoing those skilled in the art will observe that the invention provides a unique and extremely simplified method for producing reinforced plastic sheet materials and particularly for producing pleasing ornamental surfaces. Any desired ornamental pattern or appearance can be conveniently achieved by selection of a reinforcing material or member, the pattern of which it is desired to reproduce.

The herein disclosure is representative of the full essentials of the method and may easily and readily be practiced by those skilled in the art utilizing the information given. It is to be understood that variations may be made in the method disclosed without departing from the spirit and scope of the invention. The invention as disclosed herein might of course be practiced in conjunction or in relationship with previously known analogous or related methods without departing in any way from the method disclosed and claimed herein. It is also within the contemplation of the herein disclosure that the method of the invention might be practiced in a more complicated way than as herein disclosed and with possible refinements thereof all without departing in any way from the spirit and scope of the invention. The foregoing disclosure is representative of preferred forms of the invention and it is intended that it shall be interpreted in an illustrative rather than a limiting sense the invention to be accorded the full scope of the claims appended hereto.

What is claimed is:

1. A method of making an ornamental reinforced plastic sheet comprising placing a sheet of thermo-plastic material adjacent to foraminous material, heating the thermo-plastic material sufficiently to render it plastic, allowing the plastic material to deform into openings in the foraminous material solely under the influence of its own weight to thereby provide an ornamental uneven surface on opposite sides of the thermo-plastic material resulting from the deformation of the material into the openings or interstices of the foraminous material and then cooling the plastic material whereby the sheet of thermo-plastic material and the foraminous material are adhered together.

2. A method of making an ornamental reinforced plastic sheet material comprising placing a sheet of thermo-plastic material adjacent to a foraminous material having interstices therein, heating the thermo-plastic material until it is plastic, allowing the foraminous material to become at least partly imbedded in the plastic material without the application of extraneous pressure with the plastic material deforming into the interstices to provide a pattern of depressions and raised portions on both sides of the thermo-plastic material whereby a reinforced sheet of plastic material is provided having an ornamental surface.

3. A method of making an ornamental reinforced plastic sheet comprising placing a sheet of thermo-plastic material adjacent wire mesh material having interstices between the strands thereof, heating the thermo-plastic material to render it plastic, allowing the plastic material to deform into the interstices of the mesh material without the application of extraneous pressure to at least partly imbed the wire mesh material in the thermo-plastic sheet to provide an ornamental appearance formed by a pattern of raised portions and depressions where the plastic material has deformed into the interstices and cooling the plastic material.

4. A method of forming an ornamental reinforced sheet of thermoplastic material comprising placing a sheet of thermo-plastic on a layer of foraminous material having interstices, heating the thermo-plastic material until it is plastic, causing the plastic material to sag down into the interstices in the foraminous material solely under the natural influences of its own weight and cooling the thermo-plastic material whereby a sheet of thermo-plastic material is formed having an ornamental surface on both sides having a pattern of depressions and raised portions resulting from the plastic material having sagged down naturally into the interstices of the foraminous material.

5. A method of claim 4 including the step of stretching the foraminous material in substantially a horizontal plane while the thermoplastic material is applied thereto.

6. The method of making an ornamental reinforced thermoplastic sheet material comprising stretching a piece of reinforcing wire mesh material having interstices in a substantially horizontal plane, placing a sheet of thermoplastic material on reinforcing material, heating the thermo-plastic material until it is plastic, allowing the plastic material to sag down in the interstices between strands of the wire mesh material solely under the influence of its own weight without the application of any extraneous pressure or forces, cooling the plastic material with the reinforcing wire mesh material adhered thereto so that a reinforced ornamental sheet of plastic is formed having ornamental surface patterns formed by depressions and raised portions resulting from the material sagging down into the interstices.

7. The method of claim 6 wherein the plastic material is heated sufficiently and allowed to sag down sufficiently so as to fully imbed the reinforcing mesh material in the sheet of plastic material.

8. The method of claim 6 including the step of roughening the strands of the wire mesh material in order to facilitate the adhering of the plastic thereto.

9. A product comprising an ornamental reinforced unitary sheet of thermo-plastic material, said sheet of material having a layer of foraminous material having interstices adhered thereto, the sheet of plastic material having an ornamental surface provided by a uniform pattern of unevenness of the surface thereof, corresponding to the pattern of interstices in the foraminous material permanently adhered to the plastic material.

10. A product comprising an ornamental reinforced sheet of thermo-plastic material having at least partly imbedded therein a sheet of wire mesh having interstices between the strands thereof, the sheet of thermo-plastic material having an ornamental surface comprising a uniform pattern of unevenness formed by deformation of the thermoplastic material into the interstices and around the wire strands between interstices, said pattern having a conformation and exterior surface conforming to and configurated solely from the thermo-plastic material sagging while soft naturally into the interstices to imbed the mesh into the thermo-plastic.

References Cited in the file of this patent

UNITED STATES PATENTS

| | | |
|---|---|---|
| 453,489 | Koskul | June 2, 1891 |
| 2,003,494 | Reynolds | June 4, 1935 |
| 2,071,921 | Dickson | Feb. 23, 1937 |
| 2,130,359 | Miller | Sept. 20, 1938 |
| 2,500,598 | Axelrod | Mar. 14, 1950 |
| 2,622,052 | Chandler | Dec. 16, 1952 |
| 2,660,757 | Smith et al. | Dec. 1, 1953 |
| 2,688,581 | Stubbs | Sept. 7, 1954 |
| 2,688,582 | Phair et al. | Sept. 7, 1954 |
| 2,827,414 | Bussard et al. | Mar. 18, 1958 |

FOREIGN PATENTS

| | | |
|---|---|---|
| 591,298 | Great Britain | Aug. 13, 1947 |
| 635,091 | Great Britain | Apr. 5, 1950 |